(12) United States Patent
Wang et al.

(10) Patent No.: US 11,427,893 B2
(45) Date of Patent: *Aug. 30, 2022

(54) HEAT EXCHANGER

(71) Applicant: Mitsubishi Heavy Industries, Ltd., Tokyo (JP)

(72) Inventors: Yuting Wang, Tokyo (JP); Shinya Imano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 229 days.

This patent is subject to a terminal disclaimer.

(21) Appl. No.: 16/618,971

(22) PCT Filed: Mar. 7, 2019

(86) PCT No.: PCT/JP2019/009210
§ 371 (c)(1),
(2) Date: Dec. 3, 2019

(87) PCT Pub. No.: WO2020/179085
PCT Pub. Date: Sep. 10, 2020

(65) Prior Publication Data
US 2021/0363614 A1    Nov. 25, 2021

(51) Int. Cl.
*C22C 19/07* (2006.01)
*C22F 1/10* (2006.01)
*F28F 21/08* (2006.01)
*B33Y 70/00* (2020.01)

(52) U.S. Cl.
CPC .............. *C22C 19/07* (2013.01); *B33Y 70/00* (2014.12); *C22F 1/10* (2013.01); *F28F 21/081* (2013.01)

(58) Field of Classification Search
None
See application file for complete search history.

(56) References Cited

U.S. PATENT DOCUMENTS 3,937,628 A * 2/1976 Watanabe ............. C22C 19/055
148/442
4,437,913 A    3/1984 Fukui et al.
(Continued)

FOREIGN PATENT DOCUMENTS

CA    3061851 A1    11/2019
CN    1053094 A     7/1991
(Continued)

OTHER PUBLICATIONS

International Search Report dated Nov. 17, 2020 for International Application No. PCT/JP2020/033544.
(Continued)

*Primary Examiner* — Elizabeth Collister
(74) *Attorney, Agent, or Firm* — Volpe Koenig

(57) ABSTRACT

A Co-based alloy heat exchanger comprises: in mass %, 0.08-0.25% C; 0.1% or less B; 10-30% Cr; 5% or less Fe and 30% or less Ni, the total amount of Fe and Ni being 30% or less; W and/or Mo, the total amount of W and Mo being 5-12%; Ti, Zr, Nb and Ta, the total amount of Ti, Zr, Nb and Ta being 0.5-2%; 0.5% or less Si; 0.5% or less Mn; 0.003-0.04% N; and the balance being Co and impurities. The impurities include 0.5% or less Al, and 0.04% or less O. The heat exchanger is a polycrystalline body of matrix crystal grains with an average size of 5-100 μm. In the matrix crystal grains, segregation cells with an average size of 0.13-2 μm are formed, wherein components constituting an MC type carbide comprising Ti, Zr, Nb and/or Ta are segregated in boundary regions of the segregation cells.

8 Claims, 6 Drawing Sheets

(56) References Cited

U.S. PATENT DOCUMENTS

| | | | |
|---|---|---|---|
| 4,789,412 | A | 12/1988 | Nakamura et al. |
| 5,403,547 | A | 4/1995 | Smith et al. |
| 5,640,667 | A | 6/1997 | Freitag et al. |
| 7,067,201 | B2 | 6/2006 | Ellis et al. |
| 7,165,325 | B2 | 1/2007 | Imano et al. |
| 9,346,101 | B2 | 5/2016 | Zheng et al. |
| 10,632,535 | B2 | 4/2020 | Imano et al. |
| 2004/0033158 | A1 | 2/2004 | Chiba et al. |
| 2004/0050114 | A1* | 3/2004 | Berthod .................. C22C 19/07 65/457 |
| 2008/0185078 | A1 | 8/2008 | Ishida et al. |
| 2010/0241287 | A1 | 9/2010 | Nishino et al. |
| 2010/0296962 | A1 | 11/2010 | Hasselqvist et al. |
| 2012/0279351 | A1 | 11/2012 | Gu et al. |
| 2013/0206287 | A1 | 8/2013 | Sato et al. |
| 2013/0263977 | A1 | 10/2013 | Rickenbacher et al. |
| 2014/0295087 | A1 | 10/2014 | Rickenbacher et al. |
| 2015/0068629 | A1 | 3/2015 | Kottilingam et al. |
| 2016/0151860 | A1 | 6/2016 | Engeli et al. |
| 2016/0175934 | A1 | 6/2016 | Lacy et al. |
| 2016/0200045 | A1 | 7/2016 | Hopkins et al. |
| 2016/0258298 | A1 | 9/2016 | Channel et al. |
| 2017/0241287 | A1 | 8/2017 | Nakamura et al. |
| 2017/0291220 | A1 | 10/2017 | Nakamura et al. |
| 2018/0264547 | A1 | 9/2018 | Tamura et al. |
| 2019/0076926 | A1 | 3/2019 | Imano et al. |
| 2019/0226058 | A1 | 7/2019 | Fujieda et al. |
| 2020/0016658 | A1 | 1/2020 | Imano et al. |
| 2020/0016659 | A1 | 1/2020 | Imano et al. |
| 2020/0094325 | A1 | 3/2020 | Taneike et al. |
| 2021/0332460 | A1 | 10/2021 | Wang et al. |

FOREIGN PATENT DOCUMENTS

| | | |
|---|---|---|
| CN | 101528959 A | 9/2009 |
| CN | 103069028 A | 4/2013 |
| CN | 107513642 A | 12/2017 |
| EP | 1378579 B1 | 11/2005 |
| JP | 55-076038 A2 | 6/1980 |
| JP | 58-042741 A2 | 3/1983 |
| JP | 58-117848 A2 | 7/1983 |
| JP | 61-243143 A | 10/1986 |
| JP | 63-011638 A | 1/1988 |
| JP | 63-011638 A2 | 1/1988 |
| JP | 06-287667 A | 10/1994 |
| JP | 07-179967 A | 7/1995 |
| JP | 09-157780 A | 6/1997 |
| JP | 2002-249838 A | 9/2002 |
| JP | 2006-089796 A | 4/2006 |
| JP | 2009-228024 A | 10/2009 |
| JP | 2015-072007 A | 4/2015 |
| JP | 2016-029217 A | 3/2016 |
| JP | 2016-102229 A | 6/2016 |
| JP | 2016-102257 A | 6/2016 |
| JP | 2016-535169 A | 11/2016 |
| JP | 2017-145483 A | 8/2017 |
| JP | 2017-186620 A | 10/2017 |
| JP | 6311638 B2 | 4/2018 |
| JP | 2019-049022 A | 3/2019 |
| JP | 06-509290 B2 | 5/2019 |
| JP | 2019-173175 A | 10/2019 |
| JP | 2020-143379 A | 9/2020 |
| MX | 2015016373 A | 5/2017 |
| WO | 1997/010368 A1 | 3/1997 |
| WO | 2013/087515 A1 | 6/2013 |
| WO | 2015/073081 A1 | 5/2015 |
| WO | 2018/181098 A1 | 10/2018 |
| WO | 2019/031577 A1 | 2/2019 |
| WO | 2020/121367 A1 | 6/2020 |
| WO | 2020/179080 A1 | 9/2020 |
| WO | 2020/179081 A1 | 9/2020 |
| WO | 2020/179083 A1 | 9/2020 |
| WO | 2020/179084 A1 | 9/2020 |
| WO | 2020/179085 A1 | 9/2020 |
| WO | 2021/033546 A1 | 2/2021 |
| WO | 2021/033547 A1 | 2/2021 |
| WO | 2021/131167 A1 | 7/2021 |

OTHER PUBLICATIONS

Yuan, C., et al., "Effect of Nitrogen on Microstructure and Properties of a Cast Cobalt-Base Superalloy," Advanced Materials Research, vol. 278, (2011).
International Search Report, PCT/JP2020/033546, dated Nov. 17, 2020, 3 pgs. (Japanese only).
U.S. Office Action dated Jan. 8, 2021 for U.S. Appl. No. 16/582,517.
Indian Office Action dated Mar. 1, 2021 for Indian Patent Application No. 201814033368.
Japanese Office Action dated Feb. 24, 2021 for Japanese Patent Application No. 2020-509122.
Japanese Office Action dated Feb. 24, 2021 for Japanese Patent Application No. 2020-509117.
Japanese Office Action dated Feb. 24, 2021 for Japanese Patent Application No. 2020-508062.
Australian Office Action dated Oct. 14, 2020 for Australian Patent Application No. 2018422117.
Canadian Office Action dated Apr. 13, 2021 for Canadian Patent Application No. 3 061 851.
International Search Report, PCT/JP2019/009210, dated Jun. 11, 2019, 2 pgs. (Japanese language only).
Extended European Search Report dated Nov. 30, 2020 for European Patent Application No. 19808671.2.
Yuan et al., "Effect of Nitrogen on Microstructure and Properties of a Cast Cobalt-base Superalloy", Advanced Materials Research, vol. 278, pp. 472-478, (2011).
Sears, "Laser Additive Manufacturing for Improved Wear and Performance", Advances in Powder Metallurgy & Particulate Materials, Metal Powder Industries Federation, Princeton, NJ, US, vol. 8 (2009).
Holt et al., "Impurities and Trace Elements in Nickel-base Superalloys", International Metals Reviews, pp. 1-24, Mar. 1976.
Extended European Search Report dated Dec. 4, 2019 for the European Patent Application No. 19197443.5.
Extended European Search Report dated Dec. 4, 2019 for the European Patent Application No. 19197441.9.
Chinese Office Action dated Apr. 27, 2020 for the Chinese Patent Application No. 201811040282.2.
Extended European Search Report dated Nov. 9, 2020 for the European Patent Application No. 19813222.7.
Extended European Search Report dated Nov. 9, 2020 for the European Patent Application No. 19808959.1.
Extended European Search Report issued in European Application No. 18192365.7, dated Nov. 8, 2018, 10 pages.
International Search Report issued in International Application No. PCT/JP2019/009205, dated Jun. 4, 2019, 5 pages. (English translation 2 pages).
International Search Report issued in International Application No. PCT/JP2019/009206, dated Jun. 4, 2019, 5 pages. (English translation 2 pages).
International Search Report issued in International Application No. PCT/JP2019/009208, dated Jun. 4, 2019, 5 pages. (English translation 2 pages).
International Search Report issued in International Application No. PCT/JP2019/009209, dated Jun. 4, 2019, 5 pages. (English translation 2 pages).
International Search Report, PCT/JP2020/033546, dated Nov. 17, 2020, 3 pgs.
International Search Report, PCT/JP2020/033547, dated Nov. 11, 2020; 3 pgs.
Tan et al., "Carbide precipitation characteristics in additive manufacturing of Co—Cr—Mo alloy via selective electron beam melting." Scripta Materialia 143: 117-121 (2018).

* cited by examiner

HEAT EXCHANGER

TECHNICAL FIELD OF THE INVENTION

The present invention relates to heat exchangers and, in particular, to a heat exchanger using a cobalt based alloy article having excellent mechanical properties at high temperatures.

DESCRIPTION OF BACKGROUND ART

Cobalt (Co) based alloy articles, along with nickel (Ni) based alloy articles, are representative heat resistant alloy materials. Also referred to as super alloys, they are widely used for high temperature members (components used under high temperature environment, e.g. gas turbine members, steam turbine members, etc.). Although Co based alloy articles are higher in material costs than Ni based alloy articles, they have been used for applications such as turbine stator blades and combustor members because of their excellence in corrosion resistance and abrasion resistance, and their ease of solid solution strengthening.

In Ni based alloy materials, various improvements that have been made so far in composition and manufacturing processes of heat resistant alloy materials have led to the development of strengthening through γ' phase (e.g. $Ni_3(Al, Ti)$ phase) precipitation, which has now become mainstream. On the other hand, in Co based alloy materials, an intermetallic compound phase that contributes to improving mechanical properties, like the γ' phase in Ni based alloy materials, hardly precipitates, which has prompted research on carbide phase precipitation strengthening.

For example, Patent Literature 1 (JP Shou 61 (1986)-243143 A) discloses a Co based superplastic alloy made up of a Co based alloy matrix having a crystal grain size of equal to or less than 10 μm and carbide grains in a granular form or a particulate form having a grain size of 0.5 to 10 μm precipitated in the matrix. The Co based alloy includes 0.15 to 1 wt. % of C, 15 to 40 wt. % of Cr, 3 to 15 wt. % of W or Mo, 1 wt. % or less of B, 0 to 20 wt. % of Ni, 0 to 1.0 wt. % of Nb, 0 to 1.0 wt. % of Zr, 0 to 1.0 wt. % of Ta, 0 to 3 wt. % of Ti, 0 to 3 wt. % of Al, and the balance of Co. According to Patent Literature 1 (JP Shou 61 (1986)-243143 A), there can be provided a Co based superplastic alloy that exhibits superplasticity accompanying with an elongation of equal to or more than 70% even in a low temperature range (e.g. at 950° C.), and is capable of being formed into an article with a complicated shape by plastic working such as forging.

Patent Literature 2 (JP Hei 7 (1995)-179967 A) discloses a Co based alloy that is excellent in corrosion resistance, abrasion resistance, and high temperature strength. The alloy includes 21 to 29 wt. % of Cr, 15 to 24 wt. % of Mo, 0.5 to 2 wt. % of B, 0.1 or more and less than 0.5 wt. % of Si, more than 1 and equal to or less than 2 wt. % of C, 2 wt. % or less of Fe, wt. % or less of Ni, and the balance of substantially Co. According to Patent Literature 2 (JP Hei 7 (1995)-179967 A), the Co based alloy has a composite structure in which a molybdenum boride and a chromium carbide are relatively finely dispersed in a quaternary alloy phase of Co, Cr, Mo and Si and exhibits excellent corrosion resistance, abrasion resistance, and high strength.

Meanwhile, in recent years, three dimensional shaping technology (the so-called 3D printing) such as additive manufacturing or AM has received much attention as a technique for manufacturing finished products with a complicated shape by near net shaping. To apply the three dimensional shaping technology to heat resistant alloy components, vigorous research and development activities are currently being carried out.

For example, Patent Literature 3 (JP 2016-535169 A) discloses a method of producing layers including the steps of: (a) providing a source of a powdered or suspended granular composite powder having a porosity of 20% or less; (b) depositing a first portion of said powder onto a target surface; (c) depositing energy into the powder of said first portion under conditions that said energy causes sintering, fusing or melting of the first powder portion so as to create a first layer; (d) depositing a second portion of powder onto said first layer; and (e) depositing energy into the powder of said second portion under conditions that said energy causes sintering, fusing or melting of the second powder portion so as to create a second layer. In the method, the energy is supplied by a laser.

Patent Literature 3 (JP 2016-535169 A) teaches as follows: Selective laser melting (SLM) or direct metal laser melting (DMLM) uses laser to make a material a full melt. Full melting is typically useful for a monomaterial (e.g. pure titanium or a single alloy such as Ti-6Al-4V), as there is just one melting point. By contrast, selective laser sintering (SLS) and direct metal laser sintering (DMLS) are essentially the same thing, and SLS/DMLS is used to apply processes to a variety of materials—multiple metals, alloys, or combinations of alloys and other materials such as plastics, ceramics, polymers, carbides or glasses. Meanwhile, sintering is apart from melting, and a sintering process does not fully melt a material but heats it to the point that the material can fuse together on a molecular level.

CITATION LIST

Patent Literature

Patent Literature 1: JP Shou 61 (1986)-243143 A,
Patent Literature 2: JP Hei 7 (1995)-179967 A, and
Patent Literature 3: JP 2016-535169 A.

SUMMARY OF THE INVENTION

Problems to be Solved by the Invention

A heat exchanger is one of very important high temperature articles in addition to typical high temperature members such as turbine rotor blades, turbine stator blades and combustor members. In high temperature high output power systems such as turbines, temperature of the main fluid is getting higher from the viewpoint of increasing output efficiency of the systems. Thereby, higher temperatures and higher efficiency than before have been required in heat exchangers.

There are various types of heat exchangers (e.g. plate type, plate-fin type, shell-tube type, and spiral type). Conventional heat exchangers are manufactured by brazing together components (e.g. between plates, between plates and fins, and between shells and tubes). However, there is a weak point in that heatproof temperature of the conventional heat exchanger is limited by the melting temperature of the brazing filler material used. From the viewpoint of the heatproof temperature of heat exchanger, it is desirable to bond by welding together the components.

On the other hand, from the viewpoints of reducing weight and improving efficiency (thereby reducing size) of the heat exchanger, it is generally preferable that each component is thin and that an appropriate uneven shape (concavo-convex pattern) is formed on flow path surfaces. However, these requirements make it difficult to weld the components together. In other words, it would be very difficult to manufacture a heat exchanger exhibiting higher heatproof temperatures and higher efficiency than before by means of conventional techniques.

Here, since the 3D printing is capable of directly and integrally forming even alloy members with complicated shapes such as heat exchangers, bonding techniques such as brazing and welding are not required. Therefore, manufacturing of heat exchangers by the 3D printing is very attractive in terms of heatproof property, light weighting, downsizing, reduction of manufacturing work time and improvement of manufacturing yield (i.e. reduction of manufacturing cost).

Co based alloy materials such as the ones disclosed in Patent Literatures 1 and 2 are thought to have mechanical properties superior to those of previous Co based alloy materials. Unfortunately, however, their mechanical properties are inferior to those of precipitation-strengthened Ni based alloy materials of recent years. Therefore, many studies on additively manufactured articles (AM articles) for use as high temperature components are currently directed toward precipitation-strengthened Ni based alloy materials.

However, AM articles of the precipitation-strengthened Ni based alloys are prone to have problems such as generation of the γ' phase, which is the core of their mechanical properties, being hindered and internal defects occurring in the finished products. As a result, expected mechanical properties have not been sufficiently achieved. This is attributable to the fact that current precipitation-strengthened Ni based alloy materials used for high temperature components have been optimized through melting and forging processes under high vacuum, and therefore oxidation and nitriding of the Al component and the Ti component, which constitute the γ' phase, easily occur at the stages of preparing alloy powder for AM and performing AM.

On the other hand, manufacturing the Co based alloy materials such as the ones disclosed in Patent Literatures 1 and 2 does not require precipitation of an intermetallic compound phase such as the γ' phase as in Ni based alloy materials, so Co based alloy materials do not contain plenty of Al or Ti, which is easily oxidized. This means melting and forging processes in the air atmosphere are available for their manufacturing. Therefore, such Co based alloy materials are considered to be advantageous in manufacturing of alloy powder for AM and manufacturing of AM articles. Also, the Co based alloy materials have advantages with corrosion resistance and abrasion resistance comparable to or superior to those of Ni based alloy materials.

However, as mentioned above, conventional Co based alloy materials have disadvantages of mechanical properties inferior to those of γ' phase precipitation-strengthened Ni based alloy materials. In other words, if a Co based alloy material could achieve mechanical properties comparable to or superior to those of γ' phase precipitation-strengthened Ni based alloy materials (e.g. 875° C. or higher of the creep temperature endurable for 100,000 hours at a stress of 58 MPa, and 450 MPa or more of the tensile strength at a room temperature), AM articles of the Co based alloy material would become highly attractive high temperature members.

The present invention was made in view of the foregoing and has an objective to provide a heat exchanger made of a Co based alloy having superior mechanical properties and exhibiting higher heatproof properties than the conventional heat exchangers assembled by brazing.

Solution to Problems (I) According to one aspect of the present invention, there is provided a heat exchanger formed of a cobalt based alloy. The cobalt based alloy has a chemical composition including: 0.08 to 0.25 mass % of carbon (C); 0.1 mass % or less of boron (B); 10 to 30 mass % of chromium (Cr); 5 mass % or less of iron (Fe) and 30 mass % or less of nickel (Ni), the total amount of the Fe and the Ni being 30 mass % or less; tungsten (W) and/or molybdenum (Mo), the total amount of the W and the Mo being 5 to 12 mass %; titanium (Ti), zirconium (Zr), niobium (Nb) and tantalum (Ta), the total amount of the Ti, the Zr, the Nb and the Ta being 0.5 to 2 mass %; 0.5 mass % or less of silicon (Si); 0.5 mass % or less of manganese (Mn); 0.003 to 0.04 mass % of nitrogen (N); and the balance being cobalt (Co) and impurities. The impurities include 0.5 mass % or less of aluminum (Al), and 0.04 mass % or less of oxygen (O). The heat exchanger is a polycrystalline body of matrix phase crystal grains with an average crystal grain size of 5 to 100 μm. In the matrix phase crystal grains of the polycrystalline body, segregation cells with an average size of 0.13 to 2 μm are formed, in which components constituting an MC type carbide phase comprising the Ti, Zr, Nb and/or Ta are segregated in boundary regions of the segregation cells.

(II) According to another aspect of the invention, there is provided another heat exchanger formed of a Co based alloy. The Co based alloy has a chemical composition including: 0.08 to 0.25 mass % of C; 0.1 mass % or less of B; 10 to 30 mass % of Cr; 5 mass % or less of Fe and 30 mass % or less of Ni, the total amount of the Fe and the Ni being 30 mass % or less; W and/or Mo, the total amount of the W and the Mo being 5 to 12 mass %; Ti, Zr, Nb and Ta, the total amount of the Ti, the Zr, the Nb and the Ta being 0.5 to 2 mass %; 0.5 mass % or less of Si; 0.5 mass % or less of Mn; 0.003 to 0.04 mass % of N; and the balance being Co and impurities. The impurities include 0.5 mass % or less of Al, and 0.04 mass % or less of O. The heat exchanger is a polycrystalline body of matrix phase crystal grains with an average crystal grain size of 20 to 150 μm. In the matrix phase crystal grains of the polycrystalline body, grains of an MC type carbide phase comprising the Ti, Zr, Nb and/or Ta are precipitated at an average intergrain distance of 0.13 to 2 μm.

In each of the above heat exchangers (I) and (II) of the invention, the following changes and modifications can be made.

(i) The chemical composition may include 0.01 to 1 mass % of the Ti, 0.05 to 1.5 mass % of the Zr, 0.02 to 1 mass % of the Nb, and 0.05 to 1.5 mass % of the Ta.

Furthermore, in the above heat exchanger (II) of the invention, the following changes and modifications can be made.

(ii) The heat exchanger may exhibit a 0.2% proof stress of 450 MPa or more at room temperature and a creep temperature endurable for 100,000 hours at a stress of 58 MPa being 875° C. or higher.

Advantages of the Invention

According to the present invention, there can be provided a heat exchanger made of a Co based alloy having superior mechanical properties and exhibiting higher heatproof properties than the conventional heat exchangers assembled by brazing.

DETAILED DESCRIPTION OF THE PREFERRED EMBODIMENTS

[Basic Concept of the Present Invention]

Figure 1:
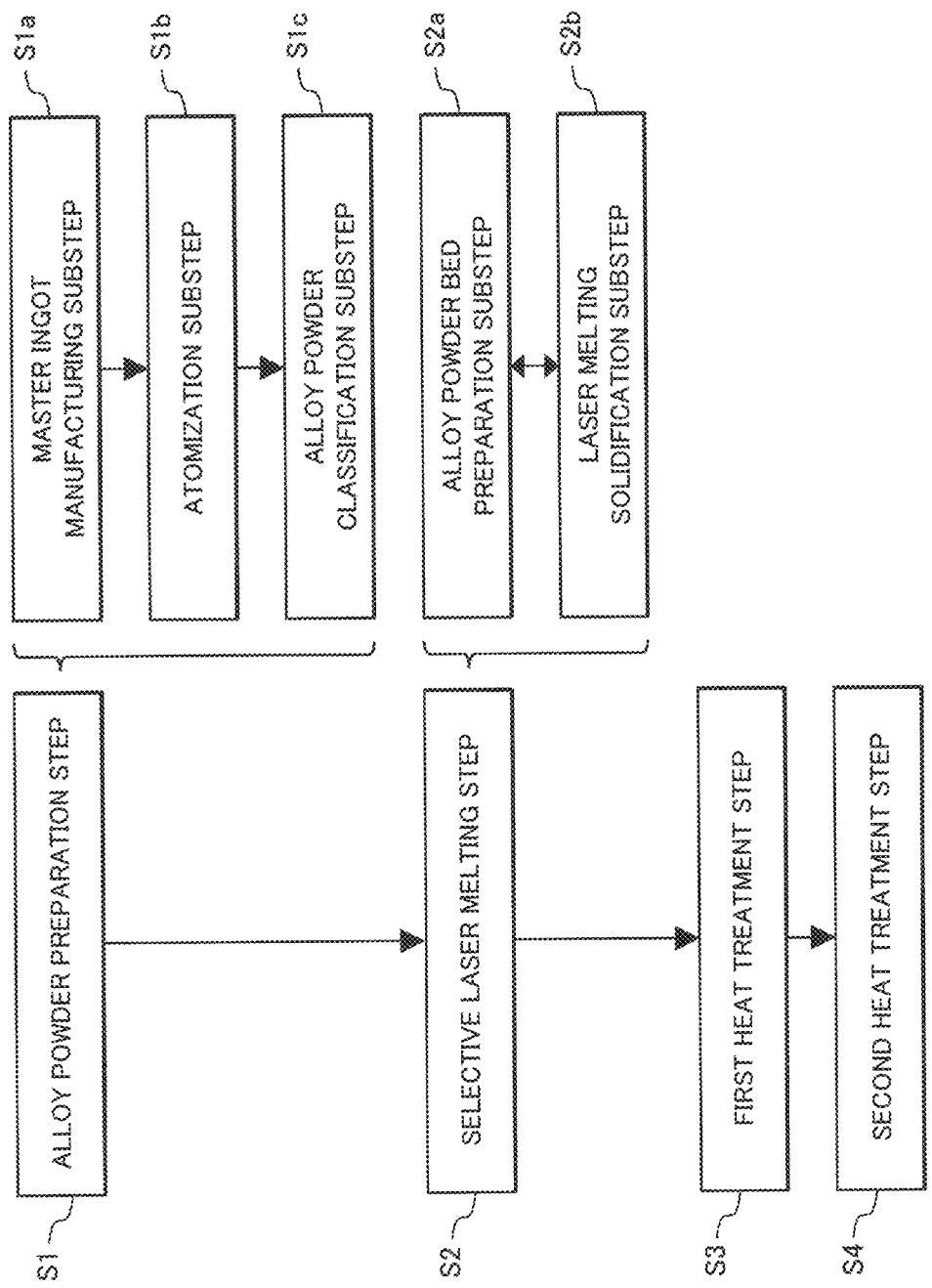
FIG. 1 is a flow diagram showing an exemplary process of a method for manufacturing a heat exchanger according to the present invention.

As mentioned before, various research and development activities have been carried out on strengthening of Co based alloy materials through carbide phase precipitation. Carbide phases that contribute to precipitation strengthening include, e.g., MC type carbide phases of Ti, Zr, Nb and Ta, and complex carbide phases of these metallic elements.

Each of the Ti, Zr, Nb and Ta components and the C component, which are indispensable in formation of a carbide phase, tend to segregate significantly at final solidification portions (e.g. dendrite boundaries, crystal grain boundaries, etc.) at the melting and solidification stages of the Co based alloy. So, in conventional Co based alloy materials, the carbide phase grains precipitate along the dendrite boundaries and crystal grain boundaries in the matrix. In a general cast material of a Co based alloy, for example, the average spacing between dendrite boundaries and the average crystal grain size are on the order of $10^1$ to $10^2$ μm, and therefore the average spacing between carbide phase grains is also on the order of $10^1$ to $10^2$ μm. Furthermore, even with the relatively fast solidification rate of laser welding, for example, the average spacing between carbide phase grains at the solidified portions is around 5 μm.

Precipitation strengthening in alloys is generally known to be inversely proportional to the average spacing between precipitates, and it is considered that precipitation strengthening is effective only when the average spacing between precipitates is around 2 μm or less. However, with the above-mentioned conventional technology, the average spacing between precipitates has not reached this level in a Co based alloy material, and sufficient precipitation strengthening effect has not been achieved. In other words, with the conventional technology, it has been difficult to finely and dispersedly precipitate carbide phase grains that might contribute to strengthening alloys. This would be the main factor behind the fact that Co based alloy materials have been said to have mechanical properties inferior to those of precipitation-strengthened Ni based alloy materials.

Meanwhile, another carbide phase that can precipitate in Co based alloys is the Cr carbide phase. Since the Cr component is highly solid soluble to the Co based alloy matrix and hardly segregate, the Cr carbide phase can be dispersedly precipitated in the matrix phase crystal grains. However, the Cr carbide phase is poor in lattice matching with the Co based alloy matrix crystals and is known to be not so effective as a precipitation-strengthening phase.

The present inventors thought that if they were able to dispersedly precipitate carbide phase grains contributing to precipitation strengthening in the matrix phase crystal grains, they would be able to dramatically improve mechanical properties of Co based alloy materials. Considering the inherent excellent corrosion resistance and abrasion resistance of Co based alloy materials, they would be able to provide a heat-resistant alloy material that would surpass precipitation-strengthened Ni based alloy materials.

Then, in order to obtain such a Co based alloy material, the inventors conducted intensive research on alloy compositions and manufacturing methods. As a result, they have found that segregation cells with a small size are formed, in which specific components (components forming carbide phases contributing to alloy strengthening) are segregated, in the matrix phase crystal grains of a Co based alloy additive manufactured article by optimizing the alloy composition and controlling the amount of heat input for local melting and rapid solidification in an additive manufacturing method (in particular, selective laser melting). Furthermore, they have found that it is possible to dispersedly precipitate MC type carbide phase grains by conducting a specific heat treatment to the obtained AM article. The present invention was made based on these findings.

Preferred embodiments of the present invention will be hereinafter described with reference to the accompanying drawings. However, the invention is not limited to the specific embodiments described below, and various combinations with known art and modifications based on known art are possible without departing from the spirit and the scope of the invention.

[Method for Manufacturing Co Based Alloy Heat Exchanger]

FIG. 1 is a flow diagram showing an exemplary process of a method for manufacturing a heat exchanger according to the invention. As shown in FIG. 1, the method for manufacturing a heat exchanger made of a Co based alloy roughly includes: an alloy powder preparation step S1 of preparing a Co based alloy powder; and a selective laser melting step S2 of forming the prepared Co based alloy powder into an AM article with a desired shape. The method for manufacturing the heat exchanger may further include a first heat treatment step S3 of conducting a first heat treatment to the AM article formed, and a second heat treatment step S4 of conducting a second heat treatment to the AM article conducted with the first heat treatment.

In other words, a heat exchanger of the invention may be an AM article itself obtained by the selective laser melting step S2, be a heat-treated AM article obtained through the first heat treatment step S3, and be another heat-treated AM article obtained through the second heat treatment step S4. Furthermore, a heat exchanger of the invention may be an article that is applied a surface finishing step, not shown in FIG. 1, to the AM article obtained by the selective laser melting step S2, the heat-treated AM article obtained through the first heat treatment step S3 or the heat-treated AM article obtained through the second heat treatment step S4.

Each step will be hereinafter described in more detail.

(Alloy Powder Preparation Step)

In the step S1, a Co based alloy powder having a predetermined chemical composition is prepared. The chemical composition preferably includes: 0.08 to 0.25 mass % of C; 0.1 mass % or less of B; 10 to 30 mass % of Cr; 5 mass % or less of Fe and 30 mass % or less of Ni, the total amount of the Fe and the Ni being 30 mass % or less; W and/or Mo, the total amount of the W and the Mo being 5 to 12 mass %; Ti, Zr, Nb and Ta, the total amount of the Ti, the Zr, the Nb and the Ta being 0.5 to 2 mass %; 0.5 mass % or less of Si; 0.5 mass % or less of Mn; 0.003 to 0.04 mass % of N; and the balance being Co and impurities. As impurities, 0.5 mass % or less of Al and 0.04 mass % or less of O may be included.

C: 0.08 to 0.25 Mass %

The C component is an important component that constitutes an MC type carbide phase to serve as a precipitation strengthening phase (this MC type carbide phase may be referred to as "carbide phase of Ti, Zr, Nb and/or Ta" or "precipitation reinforcing carbide phase"). The content of the C component is preferably 0.08 to 0.25 mass %, more preferably 0.1 to 0.2 mass %, and even more preferably 0.12 to 0.18 mass %. When the C content is less than 0.08 mass %, the amount of precipitation of the precipitation reinforcing carbide phase is insufficient, resulting in an insufficient effect of improving the mechanical properties. By contrast, when the C content is over 0.25 mass %, the alloy material becomes excessively hard, which leads to deteriorated ductility and toughness.

B: 0.1 Mass % or Less

The B component contributes to improving bondability between crystal grain boundaries (the so-called grain boundary strengthening). Although the B is not an essential component, when it is contained in the alloy, the content of the B component is preferably 0.1 mass % or less and more preferably 0.005 to 0.05 mass %. When the B component is over 0.1 mass %, cracking (e.g. solidification cracking) is prone to occur during formation of the AM article.

Cr: 10 to 30 Mass %

The Cr component contributes to improving corrosion resistance and oxidation resistance. The content of the Cr component is preferably 10 to 30 mass % and more preferably 15 to 27 mass %. In the case where a corrosion resistant coating layer is provided on the outermost surface of the Co based alloy product, the content of the Cr component is even more preferably 10 to 18 mass %. When the Cr content is less than 10 mass %, advantageous effects such as improvements of the corrosion resistance and the oxidation resistance are insufficient. When the Cr content is over 30 mass %, the brittle σ phase and/or the excessive amount of Cr carbide phase are generated, resulting in deteriorated mechanical properties (i.e. toughness, ductility, strength, etc.). Meanwhile, in the invention Cr carbide phase generation itself in the article is not denied.

Ni: 30 Mass % or Less

Being similar to Co component in properties but less expensive than Co, the Ni component may be used to replace part of the Co component. Although the Ni is not an essential component, when it is contained in the alloy, the content of the Ni component is preferably 30 mass % or less, more preferably 20 mass % or less, and more preferably 5 to 15 mass %. When the Ni content is over 30 mass %, the abrasion resistance and the local stress resistance, which are characteristics of Co based alloys, deteriorate. This is attributable to the difference in stacking fault energy between Co and Ni.

Fe: 5 Mass % or Less

Being much less expensive than Ni and similar to Ni component in properties, the Fe component may be used to replace part of the Ni component. The total content of the Fe and Ni is preferably 30 mass % or less, more preferably 20 mass % or less, and even more preferably 5 to 15 mass %. Although the Fe is not an essential component, when it is contained in the alloy, the content of the Fe component is preferably 5 mass % or less and more preferably 3 mass % or less in the range less than the Ni content. When the Fe content is over 5 mass %, the corrosion resistance and mechanical properties deteriorate.

W and/or Mo: 5 to 12 Mass % in Total

The W component and the Mo component contribute to solution-strengthening the matrix. The total content of the W component and/or the Mo component (at least one of W and Mo components) is preferably 5 to 12 mass % and more preferably 7 to 10 mass %. When the total content of the W component and the Mo component is less than 5 mass %, the solution strengthening of the matrix is insufficient. In contrast, when the total content of the W component and the Mo component is over 12 mass %, the brittle σ phase tends to be generated easily, resulting in deteriorated mechanical properties (i.e. toughness, ductility, etc.).

Re: 2 Mass % or Less

The Re component contributes to solution-strengthening the matrix and improving corrosion resistance. Although the Re is not an essential component, when it is contained in the alloy to replace part of the W component or the Mo component, the content of the Re component is preferably 2 mass % or less and more preferably 0.5 to 1.5 mass %. When the Re content is over 2 mass %, the advantageous effects of the Re component become saturated, and the material costs become too high.

Ti, Zr, Nb and Ta: 0.5 to 2 Mass % in Total

The Ti component, the Zr component, the Nb component, and the Ta component are important components that constitute the precipitation reinforcing carbide phase (MC type carbide phase), and all of these four components are preferably included. The total content of the Ti, Zr, Nb and Ta components is preferably 0.5 to 2 mass % and more preferably 0.5 to 1.8 mass %. When the total content is less than 0.5 mass %, the amount of precipitation of the precipitation reinforcing carbide phase is insufficient, and, as a result, the effect of improving the mechanical properties is insufficient. In contrast, when the total content is over 2 mass %, the mechanical properties deteriorate due to coarsening of the grains of the precipitation reinforcing carbide phase, accelerated generation of a brittle phase (e.g. σ phase), generation of grains of an oxide phase that does not contribute to precipitation strengthening, etc.

More specifically, the Ti content is preferably 0.01 to 1 mass % and more preferably 0.05 to 0.8 mass %. The Zr content is preferably 0.05 to 1.5 mass % and more preferably 0.1 to 1.2 mass %. The Nb content is preferably 0.02 to 1 mass % and more preferably 0.05 to 0.8 mass %. The Ta content is preferably 0.05 to 1.5 mass % and more preferably 0.1 to 1.2 mass %.

Si: 0.5 Mass % or Less

The Si component serves as a deoxidant agent and contributes to improving the mechanical properties. Although the Si is not an essential component, when it is contained in the alloy, the content of the Si component is preferably 0.5 mass % or less and more preferably 0.01 to 0.3 mass %.

When the Si content is over 0.5 mass %, coarse grains of an oxide (e.g. $SiO_2$) are generated, which causes deterioration of the mechanical properties.

Mn: 0.5 Mass % or Less

The Mn component serves as a deoxidant agent and a desulfurizing agent and contributes to improving the mechanical properties and the corrosion resistance. Although the Mn is not an essential component, when it is contained in the alloy, the content of the Mn component is preferably 0.5 mass % or less and more preferably 0.01 to 0.3 mass %. When the Mn content is over 0.5 mass %, coarse grains of a sulfide (e.g. MnS) are generated, which causes deterioration of the mechanical properties and the corrosion resistance.

N: 0.003 to 0.04 Mass %

The N component contributes to stabilizing the generation of the precipitation reinforcing carbide phase. The content of the N component is preferably 0.003 to 0.04 mass %, more preferably 0.005 to 0.03 mass %, and even more preferably 0.007 to 0.025 mass %. When the N content is less than 0.003 mass %, the advantageous effects of the N component are insufficient. Meanwhile, when the N content is over 0.04 mass %, coarse grains of a nitride (e.g. Cr nitride) are generated, which causes deterioration of the mechanical properties.

Balance: Co Component and Impurities

The Co component is one of the key components of the alloy and its content is the largest of all the components. As mentioned above, Co based alloy materials have the advantages of having corrosion resistance and abrasion resistance comparable to or superior to those of Ni based alloy materials.

The Al component is one of the impurities of the alloy and is not to be intentionally included in the alloy. However, an Al content of 0.5 mass % or less is acceptable as it does not have any serious negative influence on the mechanical properties of the Co based alloy heat exchanger. When the Al content is over 0.5 mass %, coarse grains of an oxide or nitride (e.g. $Al_2O_3$ or AlN) are generated, which causes deterioration of the mechanical properties.

The O component is also one of the impurities of the alloy and is not to be intentionally included in the alloy. However, an O content of 0.04 mass % or less is acceptable as it does not have any serious negative influence on the mechanical properties of the Co based alloy heat exchanger. When the O content is over 0.04 mass %, coarse grains of each oxide (e.g. Ti oxide, Zr oxide, Al oxide, Fe oxide, Si oxide, etc.) are generated, which causes deterioration of the mechanical properties.

In this step S1, there is no particular limitation on the method and techniques for preparing the Co based alloy powder, and any conventional method and technique may be used. For example, a master ingot manufacturing substep S1a of manufacturing a master ingot by mixing, melting, and casting the raw materials such that the ingot has a desired chemical composition and an atomization substep S1b of forming the alloy powder from the master ingot may be performed. Also, there is no particular limitation on the atomization method, and any conventional method and technique may be used. For example, gas atomizing or centrifugal force atomizing, by which spherical particles of high purity can be obtained, may be preferably used.

For ease of handling and ease of filling the alloy powder bed in the following selective laser melting step S2, the particle size of the alloy powder is preferably 5 to 100 µm, more preferably 10 to 70 µm, and even more preferably 10 to 50 µm. When the particle size of the alloy powder is less than 5 µm, fluidity of the alloy powder decreases in the following step S2 (i.e. formability of the alloy powder bed decreases), which causes deterioration of shape accuracy of the AM article. In contrast, when the particle size of the alloy powder is over 100 µm, controlling the local melting and rapid solidification of the alloy powder bed in the following step S2 becomes difficult, which leads to insufficient melting of the alloy powder and increased surface roughness of the AM article.

In view of the above, an alloy powder classification substep S1c is preferably performed so as to regulate the alloy powder particle size to 5 to 100 µm. In the present invention, when the particle size distribution of the alloy powder manufactured in the atomization substep S1b is observed to fall within the desired range, it is assumed that the substep S1c has been performed.

(Selective Laser Melting Step)

In the step S2, the prepared Co based alloy powder is formed into an AM article having a desired shape by selective laser melting (SLM). More specifically, this step comprises alternate repetition of an alloy powder bed preparation substep S2a and a laser melting solidification substep S2b. In the step S2a, the Co based alloy powder is laid such that it forms an alloy powder bed having a predetermined thickness, and in the step S2b, a predetermined region of the alloy powder bed is irradiated with a laser beam to locally melt and rapidly solidify the Co based alloy powder in the region.

In this step S2, in order to obtain a finished heat exchanger having a desired microstructure (a microstructure in which the segregation cells are formed in the matrix phase crystal grains, and components constituting the MC type carbide phase are segregated in boundary regions of the segregation cells; and/or a microstructure in which the precipitation reinforcing carbide phase grains are dispersedly precipitated in the matrix phase crystal grains), the microstructure of the AM article is controlled by controlling the local melting and the rapid solidification of the alloy powder bed.

More specifically, the thickness of the alloy powder bed h (unit: µm), the output power of the laser beam P (unit: W), and the scanning speed of the laser beam S (unit: mm/s) are preferably controlled to satisfy the following formulas: "$15<h<150$" and "$67\times(P/S)-3.5<h<2222\times(P/S)+13$". When these formulas are not satisfied, an AM article having a desired microstructure cannot be obtained. As mentioned before, the AM article obtained by this step S2 may be regarded as a Co based alloy product according to an embodiment of the invention.

While the output power P and the scanning speed S of the laser beam basically depend on configurations of the laser apparatus, they may be determined so as to satisfy the following formulas: "$10 \leq P \leq 1000$" and "$10 \leq S \leq 7000$". Meanwhile, in the case where the AM article obtained by this step S2 might become a finished product of a Co based alloy heat exchanger, it is preferable to conduct a relaxation annealing (e.g., an annealing at 400° C. or more and less than 600° C.) for relaxing internal strain of the AM article possibly caused by rapid solidification in the SLM method.

(Co Based Alloy Additive Manufactured Article)

Figure 2:
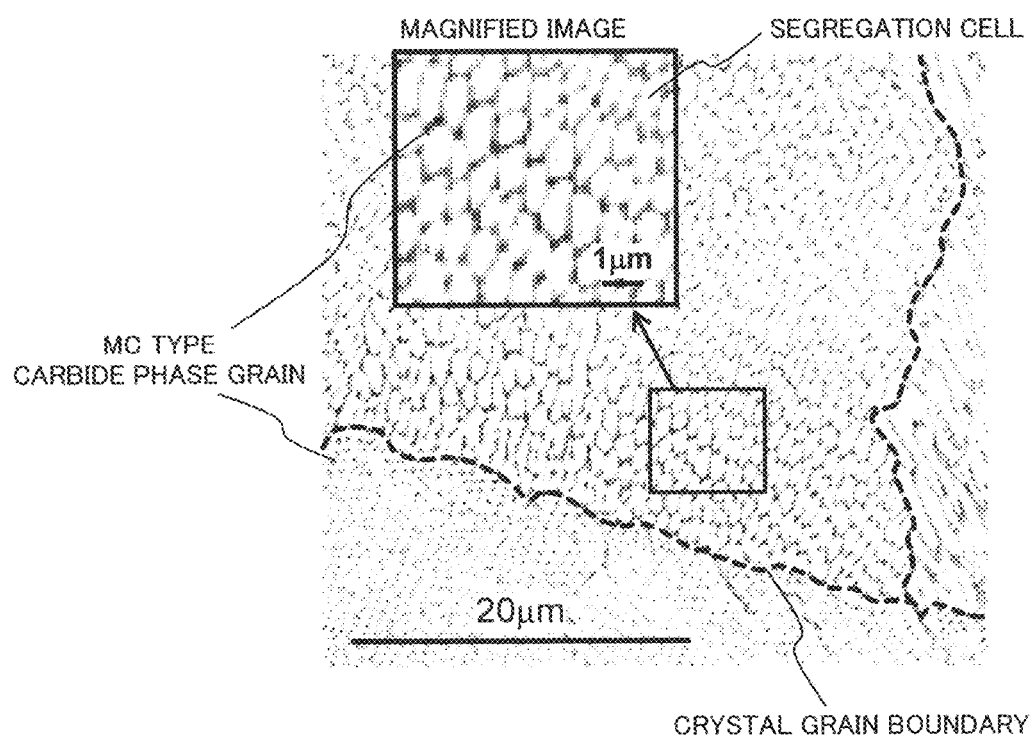
FIG. 2 is a scanning electron microscope (SEM) image showing an exemplary microstructure of a Co based alloy AM article obtained in the invention.

FIG. 2 is a scanning electron microscope (SEM) image showing an exemplary microstructure of a Co based alloy AM article obtained in the invention. As shown in FIG. 2, the Co based alloy AM article of the invention has a unique microstructure that has never been seen before.

The AM article is a polycrystalline body of matrix phase crystal grains with an average crystal grain size of 5 to 100 µm. In the matrix phase crystal grains of the polycrystalline body, segregation cells with an average size of 0.13 to 2 μm are formed. In the viewpoint of the mechanical strength, segregation cells with an average size of 0.15 to 1.5 μm are more preferable. In addition, it may be recognized that grains of the precipitation reinforcing carbide phase are precipitated on a part of boundary regions of the segregation cells.

In the invention, the size of segregation cells is basically defined as the average of the long diameter and the short diameter. However, when an aspect ratio of the longer diameter and the short diameter is three or more, twice the short diameter may be adopted as the size of segregation cell. Also, average distance among grains of the precipitation reinforcing carbide phase may be defined as the size of segregation cells because the precipitation reinforcing carbide phase grains are precipitated on the boundary regions of the segregation cells.

A more detailed microstructure observation by scanning transmission electron microscopy-energy dispersive X-ray spectrometry (STEM-EDX) has revealed that the components constituting the precipitation reinforcing carbide phase (Ti, Zr, Nb, Ta, and C) segregate in the boundary regions between the neighboring segregation cells (i.e. in outer peripheral regions of micro-cells, similar to cell walls). It has also been observed that grains precipitating on the boundary regions among these segregation cells are MC type carbide phase grains.

(First Heat Treatment Step)

In the step S3, the formed Co based alloy AM article is subjected to a first heat treatment. The first heat treatment is preferably performed at temperatures ranging from 1,100° C. to 1,200° C. with a holding duration of 0.5 to 10 hours. There is no particular limitation on a cooling method after the first heat treatment, and oil cooling, water cooling, air cooling, or furnace cooling may be used.

This first treatment allows the matrix phase crystal grains of the AM article to recrystallize, thereby reducing the internal strain in the AM article that has possibly occurred during rapid cooling solidification in the previous step S2. It is preferable that the average crystal grain size of the matrix phase crystal grains be controlled to 20 to 150 μm. When the average crystal grain size is less than 20 μm or over 150 μm, the finished heat exchanger does not exhibit sufficient creep properties.

In addition, interestingly enough, it has been found that as the matrix phase crystal grains recrystallize, the components segregated in the boundary regions of the segregation cells start to aggregate to form the reinforcing carbide phase, and as a result, the segregation cells disappear (more specifically, they become unobservable by scanning electron microscopy). The aggregation points where they begin to form the reinforcing carbide phase are thought to be at triple points and quadruple points of the former segregation cell boundaries, which causes the fine dispersion of the reinforcing carbide phase throughout the matrix phase crystal grains (within each crystal grain and on the crystal grain boundaries).

By successfully controlling the temperature and the holding duration of the first heat treatment with preventing the matrix phase crystal grains from coarsening excessively, the reinforcing carbide phase beginning to form can be grown into grain form without being aggregated/coarsened excessively. In such a case, the heat exchanger obtained through this step S3 may be considered to be a finished product.

(Second Heat Treatment Step)

In terms of preventing from the excessive coarsening of the matrix phase crystal grains (in other words, in terms of manufacturing stability and yield), it is more preferable that a second heat treatment step S4 be performed. In the step S4, the Co alloy AM articles conducted with the first heat treatment is subjected to a second heat treatment. The second heat treatment is preferably performed at temperatures ranging from 750 to 1000° C. with a holding duration of 0.5 to 10 hours. There is no particular limitation on the cooling method after the second heat treatment, and oil cooling, water cooling, air cooling, or furnace cooling may be used.

This second heat treatment allows the reinforcing carbide phase beginning to form in the first heat treatment step S3 to grow into grain form while controlling excessive coarsening of the matrix phase crystal grains. The Co based alloy heat exchanger thus obtained has an average matrix phase crystal grain size of 20 to 150 μm and includes grains of the reinforcing carbide phase finely and dispersedly precipitated in each matrix phase crystal grain at an average intergrain distance of 0.13 to 2 μm. Naturally enough, grains of the reinforcing carbide phase are dispersedly precipitated also on the grain boundaries of the matrix phase crystal grains in the heat exchanger according to the invention.

[Heat Exchanger]

Figure 3:
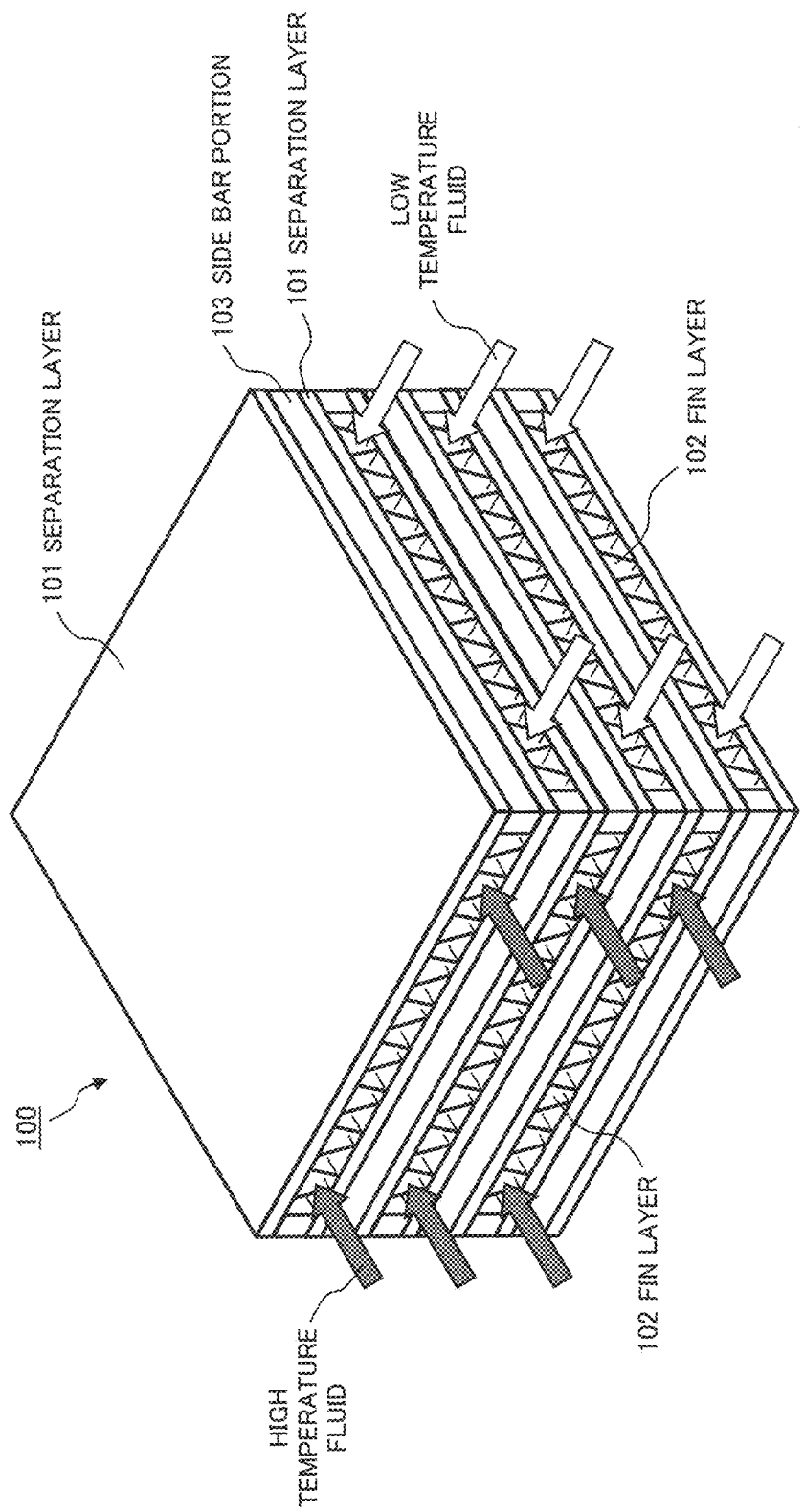
FIG. 3 is a schematic illustration of a perspective view showing an example of a heat exchanger according to the invention.

FIG. 3 is a schematic illustration of a perspective view showing an example of a heat exchanger according to the invention. A heat exchanger 100 shown in FIG. 3 is an example of a plate-fin type heat exchanger, and has a basic structure in which a separation layer 101 and a fin layer 102 are alternatively stacked each other. Both ends in the width direction of flow channels in the fin layer 102 are sealed by a side bar portion 103. Heat exchanging between high temperature fluid and low temperature fluid can be done by flowing the high temperature fluid and the low temperature fluid alternately into adjacent fin layers 102 via the separation layer 101.

A Co based alloy heat exchanger of the invention is formed integrally without brazing joining or welding joining the conventional parts constituting a heat exchanger such as separation plates, corrugated fins and side bars. Consequently, the heat exchanger has advantages improving heat resistance and weight reduction than the conventional heat exchangers. In addition, the heat transfer efficiency can be higher by forming an appropriate uneven shape (concavo-convex pattern) on the surfaces of the flow channels and making the fluid into turbulence. Improving the heat transfer efficiency leads to downsizing of the heat exchanger.

EXAMPLES

The present invention will be hereinafter described in more detail with examples and comparative examples. It should be noted that the invention is not limited to these examples.

Experimental 1

Preparation of Alloy Powders IA-1 to IA-5 of Inventive Examples and Alloy Powders CA-1 to CA-5 of Comparative Examples Co based alloy powders having the chemical compositions shown in Table 1 were prepared (the alloy powder preparation Step S1). More specifically, first, the master ingot manufacturing substep S1a was performed, in which the raw materials were mixed and subjected to melting and casting by a vacuum high frequency induction melting method so as to form a master ingot (weight: approximately 2 kg) for each powder. Next, the atomization substep S1b was performed to form each alloy powder. In the substep S1b, each master ingot was remelted and subjected to gas atomizing in an argon gas atmosphere.

Then, each alloy powder thus obtained was subjected to the alloy powder classification substep S1c to control the particle size of alloy powder. Each alloy powder was classified into an alloy powder with a particle size of 10 to 25 μm (particle size S) and another alloy powder with a particle size of 100 to 150 μm (particle size L).

a public domain program developed at the National Institutes of Health (NIH) in U.S.A.) to measure the average size of segregation cells.

Figure 4:
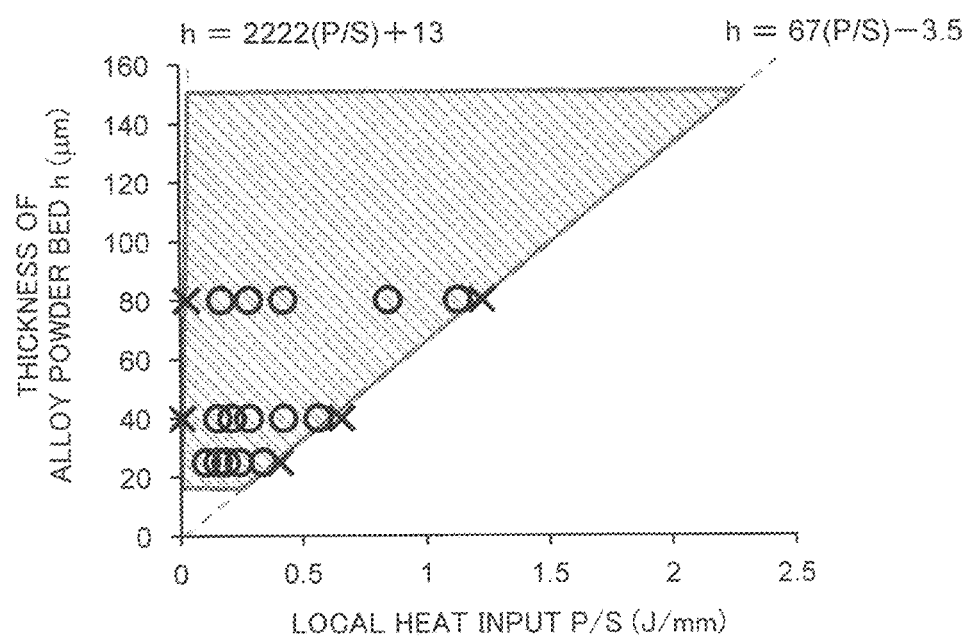
FIG. 4 shows exemplary selective laser melting (SLM) conditions in the SLM step, indicating a relationship between a thickness of an alloy powder bed and a local heat input.

FIG. 4 shows exemplary SLM conditions in the SLM step S2, indicating a relationship between the thickness of the alloy powder bed and the local heat input. In FIG. 4, "○" signifies the AM articles observed to have an average segregation cell size within a range of 0.15 to 1.5 μm and judged as "Passed", and "x" signifies the other AM articles, judged as "Failed".

TABLE 1

Chemical Compositions of Alloy Powders IA-1 to IA-5 of Inventive Examples and Alloy Powders CA-1 to CA-5 of Comparative Examples.

| Alloy Number | Chemical Composition (mass %) | | | | | | | | | | | | | | | | Ti + Zr + Nb + Ta |
|---|---|---|---|---|---|---|---|---|---|---|---|---|---|---|---|---|---|
|  | C | B | Cr | Ni | Fe | W | Ti | Zr | Nb | Ta | Si | Mn | N | Co | Al | O |  |
| IA-1 | 0.08 | 0.009 | 24.5 | 9.5 | 0.01 | 7.3 | 0.15 | 0.40 | 0.05 | 0.20 | 0.01 | 0.01 | 0.005 | Bal. | 0.01 | 0.005 | 0.80 |
| IA-2 | 0.16 | 0.011 | 25.5 | 10.5 | 0.90 | 7.7 | 0.30 | 0.60 | 0.15 | 0.40 | 0.30 | 0.20 | 0.025 | Bal. | 0.05 | 0.020 | 1.45 |
| IA-3 | 0.25 | 0.009 | 30.0 | — | — | 5.0 | 0.01 | 0.30 | 0.05 | 0.10 | 0.05 | 0.01 | 0.005 | Bal. | — | 0.005 | 0.46 |
| IA-4 | 0.16 | 0.010 | 25.0 | 10.0 | 0.02 | 7.5 | 0.25 | 0.05 | 0.09 | 0.30 | 0.01 | 0.02 | 0.010 | Bal. | — | 0.010 | 0.69 |
| IA-5 | 0.10 | 0.011 | 10.0 | 29.1 | 0.90 | 12.0 | 0.60 | 0.60 | 0.15 | 0.50 | 0.30 | 0.20 | 0.030 | Bal. | 0.05 | 0.030 | 1.85 |
| CA-1 | 0.35 | 0.009 | 32.0 | 9.5 | 0.01 | 7.3 | 0.15 | 0.40 | 0.05 | 0.50 | 0.01 | 0.01 | 0.005 | Bal. | 0.01 | 0.005 | 1.10 |
| CA-2 | 0.35 | 0.009 | 30.0 | 40.0 | 0.01 | 7.3 | 0.90 | 0.40 | 1.0 | 1.0 | 0.01 | 0.01 | 0.005 | Bal. | 2.20 | 0.005 | 3.30 |
| CA-3 | 0.40 | 0.010 | 29.0 | 10.0 | 0.20 | 7.5 | 0.20 | 0.10 | 0.10 | — | 0.10 | 0.02 | 0.001 | Bal. | — | 0.015 | 0.40 |
| CA-4 | 0.25 | 0.010 | 29.0 | 10.0 | 0.10 | 7.0 | — | — | — | — | — | 0.01 | 0.010 | Bal. | — | 0.010 | 0 |
| CA-5 | 0.11 | 0.002 | 22.0 | 23.0 | 0.01 | 14.0 | 0.01 | 0.01 | — | — | 0.50 | 0.003 | 0.006 | Bal. | 0.01 | 0.008 | 0.02 |

"—" indicates that the element was not intentionally included or not detected.
"Bal." indicates inclusion of impurities other than Al and O.

As shown in Table 1, the inventive alloy powders IA-1 to IA-5 have chemical compositions that satisfy the specifications of the invention. In contrast, the comparative alloy powder CA-1 has a C content and a Cr content that fail to satisfy the specifications of the invention. The comparative alloy powder CA-2 has a C content, an Ni content, and a total content of "Ti+Zr+Nb+Ta" that are out of the specifications of the invention. The comparative alloy powder CA-3 has a C content, an N content and a total content of "Ti+Zr+Nb+Ta" that are outside of the specifications of the invention. The comparative alloy powder CA-4 has a total content of "Ti+Zr+Nb+Ta" that fail to satisfy the specifications of the invention. The comparative alloy powder CA-5 has a W content and a total content of "Ti+Zr+Nb+Ta" that are out of the specifications of the invention.

Experiment 2

Examination of SLM Conditions in Selective Laser Melting Step

AM articles (8 mm in diameter×10 mm in length) were formed of the alloy powder IA-4 of the particle size S prepared in Experimental 1 by the SLM process (the selective laser melting step S2). The output power of the laser beam P was set at 85 W, and the local heat input P/S (unit: W×s/mm=J/mm) was controlled by varying the thickness of the alloy powder bed h and the scanning speed (mm/s) of the laser beam S. Controlling the local heat input corresponds to controlling the cooling rate.

The AM articles formed above were each subjected to microstructure observation to measure the average segregation cell size. The microstructure observation was performed by SEM. Also, the obtained SEM images were subjected to image analysis using an image processing program (ImageJ, Based on the results of Experimental 2, it has been confirmed that in the selective laser melting step S2, the SLM process is preferably performed while controlling the thickness of the alloy powder bed h (unit: μm), the output power of the laser beam P (unit: W), and the scanning speed of the laser beam S (unit: mm/s) such that they satisfy the following formulas: "15<h<150" and "67×(P/S)−3.5<h<2222×(P/S)+13". In other words, the hatched region is the passed region.

Experimental 3

Manufacturing of SLM and Heat-Treated Articles

First, an AM article (10 mm in diameter×50 mm in height) was formed of each of the alloy powders IA-2 and CA-5 with the particle size S prepared in Experimental 1 by SLM (the selective laser melting step S2). The thickness of each alloy powder bed h and the output power of the laser beam P were set at 100 μm and 100 W, respectively. The local heat input P/S (unit: W×s/mm=J/mm) was controlled by varying the scanning speed (mm/s) of the laser beam S.

Each AM article formed above was subjected to heat treatment at 1,150° C. with a holding duration of 4 hours (the first heat treatment step S3). Then, each first-heat-treated article was subjected to heat treatment at 900° C. with a holding duration of 4 hours (the second heat treatment step S4) to manufacture an SLM and heat-treated article formed of the powder IA-2 or another SLM and heat-treated article formed of the powder CA-5.

Manufacturing of LMD and Heat-Treated Articles

An AM article (10 mm in diameter×50 mm in height) was formed of each of the alloy powders IA-2 and CA-5 with the particle size L prepared in Experimental 1 by laser metal deposition (LMD). Each AM article was subjected to the first heat treatment step S3 and the second heat treatment step S4 in a similar manner to the above to manufacture an LMD and heat-treated article formed of the powder IA-2 or another LMD and heat-treated article formed of the powder CA-5. The LMD process was performed with the output power of the laser beam P set at 800 W and the scanning speed of the laser beam S set at 15 mm/s.

Meanwhile, LMD is an AM process to form a deposit in which alloy powder is fed as a laser beam is irradiated. Generally, the local heat input of LMD is larger than that of SLM. In other words, the cooling rate of LMD is slower than that of SLM.

Manufacturing of Cast and Heat-Treated Articles

A cast article (10 mm in diameter×50 mm in height) was formed of each of the alloy powder IA-2 and the alloy powder CA-5 with the particle size L prepared in Experimental 1 by precision casting. Each cast article was subjected to the first heat treatment step S3 and the second heat treatment step S4 in a similar manner to the above to manufacture a cast and heat-treated article formed of the alloy powder IA-2 or another cast and heat-treated article formed of the alloy powder CA-5.

Microstructure Observation and Mechanical Properties Testing

Test pieces for microstructure observation and mechanical properties testing were taken from the AM articles, the cast articles, and the heat-treated articles manufactured above and subjected to microstructure observation and mechanical properties testing.

The microstructure observation was performed by SEM. Furthermore, as with Experimental 2, the obtained SEM images were subjected to image analysis using an image processing program (ImageJ) to measure the average size of segregation cells, the average spacing of microsegregation, and the average intergrain distance between carbide phase grains.

For the mechanical properties testing, a tensile test was performed at room temperature (approximately 23° C.) to measure the 0.2% proof stress.

Figure 5:
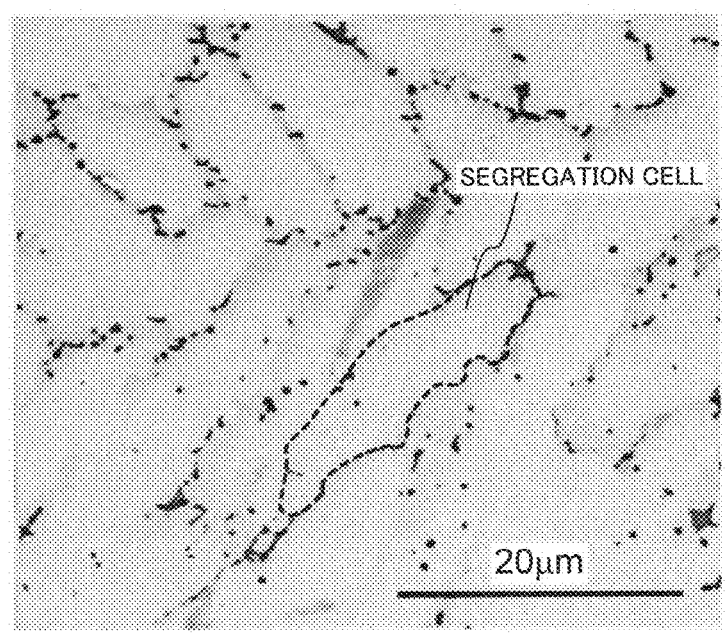
FIG. 5 is an SEM image showing an exemplary microstructure of a Co based alloy AM article formed by a laser metal deposition (LMD) method.
Figure 6:
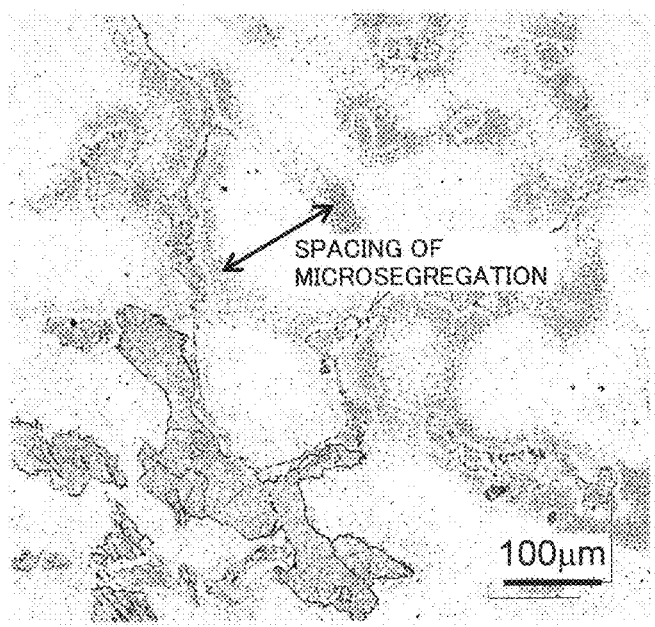
FIG. 6 is an SEM image showing an exemplary microstructure of a Co based alloy cast article formed by a precision casting method.

FIG. 5 is an SEM image showing an exemplary microstructure of a Co based alloy AM article formed by LMD. FIG. 6 is an SEM image showing an exemplary microstructure of a Co based alloy cast article formed by precision casting. Also, FIG. 2 above is an SEM image showing an exemplary microstructure of a Co based alloy AM article formed by SLM. The samples shown in FIGS. 2, 5 and 6 are formed of the alloy powder IA-2.

As mentioned before, the AM article formed by SLM (see FIG. 2) is a polycrystalline body that has segregation cells of about 1 µm in size formed in its crystal grains. In contrast, the AM article formed by LMD (see FIG. 5) is a polycrystalline body that has segregation cells of about 5 to 20 µm in size constituting each of its crystal grain. In the cast article formed by precision casting (see FIG. 6), microsegregation is observed at its dendrite boundaries, and the spacing of the microsegregation is about 100 to 300 µm.

The microstructure observation of the heat-treated articles formed by subjecting the AM articles and the cast articles to the first and second heat treatments and the measurement of the average intergrain distance of carbide phase grains revealed that the average intergrain distance of each heat-treated articles roughly matched the average size of segregation cells or the average microsegregation spacing (the microstructures are not shown). Also, it was found that when the average size of segregation cells was extremely small (e.g. about 0.1 µm or smaller), the first and second heat treatment caused adjacent carbide phase grains to combine to form larger grains (as a result, the average intergrain distance between carbide phase grains widened).

Figure 7:
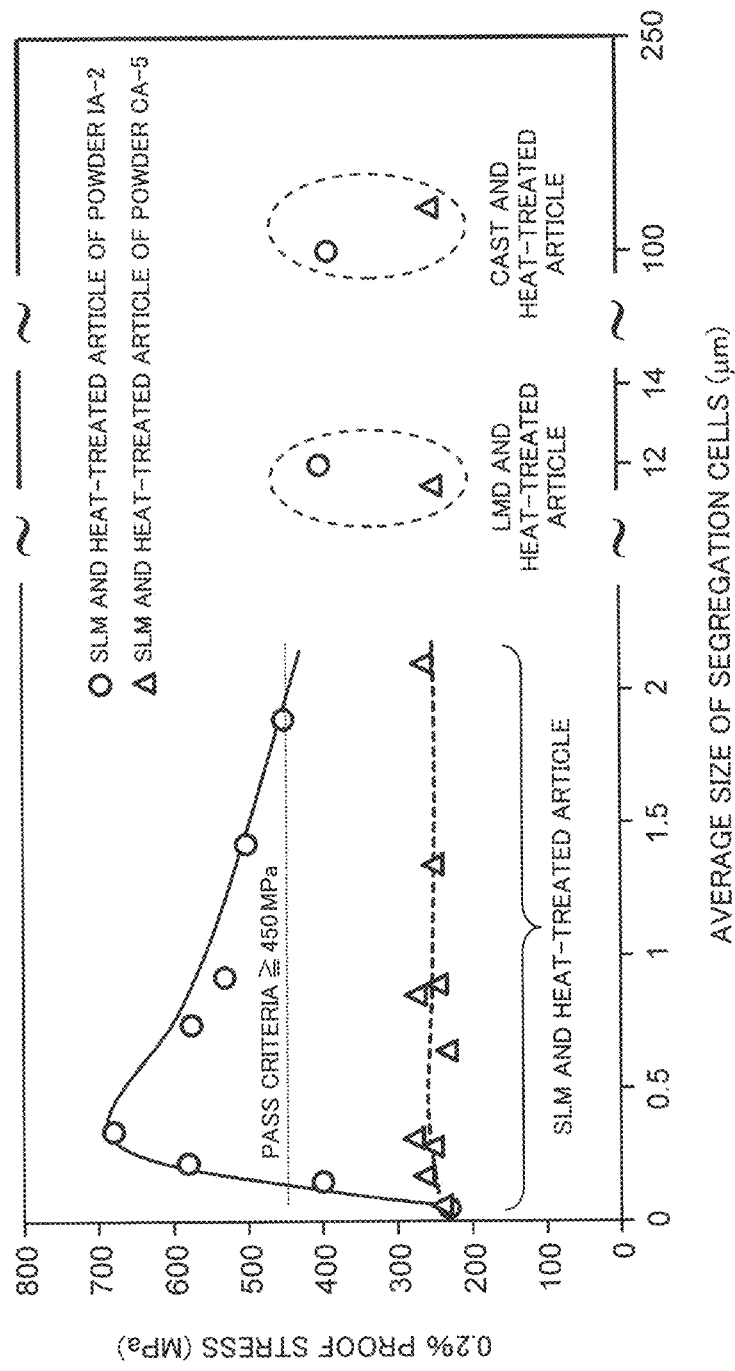
FIG. 7 is a graph showing an exemplary relationship between an average size of segregation cells of Co based alloy AM articles and a 0.2% proof stress of heat-treated Co based alloy AM articles.

Since the obtained articles had largely different microstructures, a relationship between the average size of segregation cells and a mechanical property was investigated. FIG. 7 is a graph showing an exemplary relationship between the average size of segregation cells of the Co based alloy AM articles and the 0.2% proof stress of the heat-treated Co based alloy AM articles. FIG. 7 also shows the data of the cast articles and the cast and heat-treated articles for comparison. Regarding the cast articles, the average microsegregation spacing was used in place of the average size of segregation cells.

As shown in FIG. 7, the heat-treated Co based alloy AM articles formed of the powder CA-5 exhibit an almost constant 0.2% proof stress without being affected by the average size of segregation cells. By contrast, the heat-treated Co based alloy AM articles formed of the powder IA-2 largely vary in the 0.2% proof stress according to the average size of segregation cells.

The powder CA-5 has a total content of "Ti+Zr+Nb+Ta" that is too small (i.e. it contains almost none of them). Therefore, the heat-treated AM articles formed of the powder CA-5 have microstructures in which no reinforcing carbide phase is precipitated, but Cr carbide grains are precipitated. This confirms that Cr carbide grains are not very effective as precipitation strengthening grains. In contrast, the heat-treated AM articles formed of the powder IA-2 have microstructures in which reinforcing carbide phase grains are precipitated. This is believed to have caused the substantial variation in 0.2% proof stress depending on the average segregation cell size (which determines the average intergrain distance between carbide phase grains).

Also, considering the prescribed properties of heat exchangers toward which the invention is directed, a 0.2% proof stress of 450 MPa or more is required. So, when any 0.2% proof stress of 450 MPa or more is judged as "Passed", and any 0.2% proof stress of less than 450 MPa is judged as "Failed", it has been confirmed that mechanical properties that qualify as "Passed" are obtained with the average segregation cell size (i.e. the average intergrain distance between carbide phase grains) ranging from 0.13 to 2 µm. It is more preferable that the average segregation cell size or the average intergrain distance between carbide phase grains is within a range from 0.15 to 1.5 µm.

From the results of FIG. 7, it could be considered that conventional carbide phase-precipitated Co based alloy materials have failed to exhibit sufficient mechanical properties partly because the average intergrain distance between precipitation reinforcing carbide phase grains has not been successfully controlled to fall within a desired range.

Experimental 4

Manufacturing of SLM and Heat-Treated Articles IA-1-A1 to IA-5-A1 and CA-1-A1 to CA-5-A1

An AM article (10 mm in diameter×50 mm in height) was formed of each of the alloy powders IA-1 to IA-5 and CA-1 to CA-5 of the particle size S prepared in Experimental 1 by SLM (the selective laser melting step S2). Based on the results obtained in Experimental 3, the SLM process was performed with the average intergrain distance between carbide phase grains controlled to 0.15 to 1.5 µm.

Each AM article formed above was subjected to the first heat treatment at 1,150° C. with a holding duration of 4 hours (the first heat treatment step S3). Then, the first heat-treated AM articles were each subjected to the second heat treatment within a range from 750 to 1,000° C. with a holding duration of 0.5 to 10 hours (the second heat treatment step S4) to manufacture SLM and heat-treated articles IA-1-A1 to IA-5-A1 formed of the powders IA-1 to IA-5 and SLM and heat-treated articles CA-1-A1 to CA-5-A1 formed of the powders CA-1 to CA-5.

Microstructure Observation and Mechanical Properties Testing

Test pieces for microstructure observation and mechanical properties testing were taken from the SLM and heat-treated articles IA-1-A1 to IA-5-A1 and CA-1-A1 to CA-5-A1 and subjected to microstructure observation and mechanical properties testing.

The microstructure observation was performed with SEM and through image analysis of the obtained SEM images using an image processing program (ImageJ), as with Experimental 2, to measure the average matrix phase crystal grain size and the average intergrain distance between carbide phase grains.

As to the mechanical properties testing, a creep test was conducted at 900° C. under a stress of 98 MPa to measure the creep rupture time. Based on the prescribed properties of heat exchangers toward which the invention is directed, any creep rupture time of 1,100 hours or more was judged as "Passed", and any creep rupture time of less than 1,100 hours was judged as "Failed". When the creep properties are judged as "Passed", the temperature at which the creep rupture time reaches 100,000 hours under a stress of 58 MPa is 875° C. or higher. Such creep properties can be deemed as comparable to those of Ni based alloy materials.

The results of Experimental 4 are shown in Table 2.

TABLE 2

Measurement and Testing Results of SLM and Heat-treated Articles IA-1-A1 to IA-5-A1 and CA-1-A1 to CA-5-A1.

| SLM and Heat-treated Articles No. | Alloy Powder No. | Average Matrix Phase Crystal Grain Size (µm) | Average Intergrain Distance between Reinforcing Carbide Phase Grains (µm) | Creep Test |
|---|---|---|---|---|
| IA-1-A1 | IA-1 | 75 | 0.6 | Passed |
| IA-2-A1 | IA-2 | 90 | 0.3 | Passed |
| IA-3-A1 | IA-3 | 60 | 0.8 | Passed |
| IA-4-A1 | IA-4 | 95 | 1.1 | Passed |
| IA-5-A1 | IA-5 | 85 | 1.5 | Passed |
| CA-1-A1 | CA-1 | 90 | Cr Carbide Phase Precipitation | Failed |
| CA-2-A1 | CA-2 | 65 | 2.5 | Failed |
| CA-3-A1 | CA-3 | 75 | Cr Carbide Phase Precipitation | Failed |
| CA-4-A1 | CA-4 | 95 | No Reinforcing Carbide Phase | Failed |
| CA-5-A1 | CA-5 | 70 | No Reinforcing Carbide Phase | Failed |

As shown in Table 2, the SLM and heat-treated articles IA-1-A1 to IA-5-A1 all passed the creep testing. This is not only because the average matrix phase crystal grain size is within the appropriate range but also because the average intergrain distance between precipitation reinforcing carbide phase grains (MC type carbide phase grains of Ti, Zr, Nb, and/or Ta) is sufficiently small (i.e. the precipitation reinforcing carbide phase grains are finely and dispersedly precipitated).

On the other hand, the SLM and heat-treated articles CA-1-A1 to CA-5-A1 all failed the creep testing, although the average matrix phase crystal grain size was within the appropriate range. To determine possible causes behind this, the SLM and heat-treated articles CA-1-A1 to CA-5-A1 were examined individually.

Regarding CA-1-A1, the excessive contents of C and Cr have resulted in dominant precipitation of Cr carbide grains. Regarding CA-2-A1, the excessive content of C and the excessive total content of "Ti+Zr+Nb+Ta" have resulted in coarsening of the precipitation reinforcing carbide phase grains and an increased average intergrain distance. Regarding CA-3-A1, the excessive content of C, the insufficient content of N and the insufficient total content of "Ti+Zr+Nb+Ta" have resulted in dominant precipitation of the Cr carbide grains. These results confirm that Cr carbide grains are not very effective as precipitation strengthening grains.

Regarding CA-4-A1 and CA-5-A1, the insufficient total content of "Ti+Zr+Nb+Ta" (almost none) has resulted in no precipitation of the reinforcing carbide phase itself.

Based on the results of Experimental 4, it has been confirmed that IA-1 to IA-5, which have the chemical compositions specified in the invention, are desirable as starting materials for the SLM and heat-treated articles. It has also been confirmed that creep properties can be improved by controlling the average intergrain distance between precipitation reinforcing carbide phase grains to 0.15 to 1.5 µm.

Experiment 5

Manufacturing of SLM and Heat-Treated Articles IA-1-A2 to IA-1-A7 and IA-2-A2 to IA-2-A7

AM articles (10 mm in diameter×50 mm in height) were formed of the alloy powders IA-1 and IA-2 of the particle size S prepared in Experimental 1 by SLM (the selective laser melting step S2). Based on the results obtained in Experimental 3, the SLM process was performed with the average intergrain distance between carbide phase grains controlled to 0.15 to 1.5 µm.

Each AM article formed above was subjected to the first and second heat treatments. By varying the temperature and the holding duration of the first heat treatment within ranges from 1,000 to 1,300° C. and from 0.5 to 10 hours, respectively, SLM and heat-treated articles IA-1-A2 to IA-1-A7 and IA-2-A2 to IA-2-A7 varying in average matrix phase crystal grain size were manufactured. The second heat treatment conditions were set to be the same as Experimental 4.

Microstructure Observation and Mechanical Properties Testing

Test pieces for microstructure observation and mechanical properties testing were taken from the SLM and heat-treated articles IA-1-A2 to IA-1-A7 and IA-2-A2 to IA-2-A7 and subjected to microstructure observation and mechanical properties testing.

The microstructure observation was performed with SEM and through image analysis of the obtained SEM images using an image processing program (ImageJ) in a similar manner to Experimental 2 to measure the average matrix phase crystal grain size. Also, as mechanical properties testing, a creep test was conducted in a similar manner to Experimental 4, and each article was judged as "Passed" or "Failed" based on the same criteria as Experimental 4. The results of Experiment 5 are shown in Table 3.

TABLE 3

Measurement and Testing Results of SLM and Heat-treated Articles IA-1-A2 to IA-1-A7 and IA-2-A2 to IA-2-A7.

| SLM and Heat-treated Articles No. | Alloy Powder No. | Average Matrix Phase Crystal Grain Size (μm) | Creep Test |
|---|---|---|---|
| IA-1-A2 | IA-1 | 11 | Failed |
| IA-1-A3 | | 15 | Failed |
| IA-1-A4 | | 43 | Passed |
| IA-1-A5 | | 74 | Passed |
| IA-1-A6 | | 162 | Failed |
| IA-1-A7 | | 180 | Failed |
| IA-2-A2 | IA-2 | 15 | Failed |
| IA-2-A3 | | 32 | Passed |
| IA-2-A4 | | 56 | Passed |
| IA-2-A5 | | 74 | Passed |
| IA-2-A6 | | 141 | Passed |
| IA-2-A7 | | 200 | Failed |

As shown in Table 3, it has been confirmed that the average matrix phase crystal grain size is preferably 20 to 150 μm. Also, based on the results of Experimental 5, it has been confirmed that the first heat treatment is preferably performed within a temperature range of 1,100 to 1,200° C. with a holding duration of 0.5 to 10 hours.

The above-described embodiments and Examples have been specifically given in order to help with understanding on the present invention, but the invention is not limited to the described embodiments and Examples. For example, a part of an embodiment may be replaced by known art, or added with known art. That is, a part of an embodiment of the invention may be combined with known art and modified based on known art, as far as no departing from a technical concept of the invention.

LEGEND

100 . . . heat exchanger;
101 . . . separation layer;
102 . . . fin layer; and
103 . . . side bar portion.

The invention claimed is:

1. A heat exchanger formed of a cobalt based alloy, the cobalt based alloy having a chemical composition comprising:
   0.08 to 0.25 mass % of carbon;
   0.1 mass % or less of boron;
   10 to 30 mass % of chromium;
   5 mass % or less of iron, 30 mass % or less of nickel, the total amount of the iron and the nickel being 30 mass % or less;
   tungsten and/or molybdenum, the total amount of the tungsten and the molybdenum being 5 to 12 mass %;
   titanium, zirconium, niobium and tantalum, the total amount of the titanium, the zirconium, the niobium and the tantalum being 0.69 to 2 mass %;
   0.5 mass % or less of silicon;
   0.5 mass % or less of manganese;
   0.003 to 0.04 mass % of nitrogen; and
   the balance being cobalt and impurities, the impurities including 0.5 mass % or less of aluminum, and 0.04 mass % or less of oxygen,
   wherein the heat exchanger is a polycrystalline body of matrix phase crystal grains with an average crystal grain size of 5 to 100 μm, and
   wherein in the matrix phase crystal grains of the polycrystalline body, segregation cells with an average size of 0.13 to 2 μm are formed, in which components constituting an MC type carbide phase comprising the titanium, the zirconium, the niobium and/or the tantalum are segregated in boundary regions of the segregation cells.

2. The heat exchanger according to claim 1, wherein grains of the MC type carbide phase are precipitated on the boundary regions of the segregation cells.

3. The heat exchanger according to claim 2, wherein the total amount of the titanium, zirconium, niobium and tantalum comprises:
   0.01 to 1 mass % of the titanium,
   0.05 to 1.5 mass % of the zirconium,
   0.02 to 1 mass % of the niobium, and
   0.05 to 1.5 mass % of the tantalum.

4. The heat exchanger according to claim 1 wherein each amount of the titanium, the zirconium, the niobium and the tantalum in the chemical composition is 0.01 to 1 mass %, 0.05 to 1.5 mass %, 0.02 to 1 mass %, and 0.05 to 1.5 mass, respectively.

5. A heat exchanger formed of a cobalt based alloy, the cobalt based alloy having a chemical composition comprising:
   0.08 to 0.25 mass % of carbon;
   0.1 mass % or less of boron;
   10 to 30 mass % of chromium;
   5 mass % or less of iron, 30 mass % or less of nickel, the total amount of the iron and the nickel being 30 mass % or less;
   tungsten and/or molybdenum, the total amount of the tungsten and the molybdenum being 5 to 12 mass %;
   titanium, zirconium, niobium and tantalum, the total amount of the titanium, the zirconium, the niobium and the tantalum being 0.69 to 2 mass %;
   0.5 mass % or less of silicon;
   0.5 mass % or less of manganese;
   0.003 to 0.04 mass % of nitrogen; and
   the balance being cobalt and impurities, the impurities including 0.5 mass % or less of aluminum, and 0.04 mass % or less of oxygen,
   wherein the heat exchanger is a polycrystalline body of matrix phase crystal grains with an average crystal grain size of 20 to 150 μm, and
   wherein in the matrix phase crystal grains of the polycrystalline body, grains of an MC type carbide phase comprising the titanium, the zirconium, the niobium and/or the tantalum are precipitated at an average intergrain distance of 0.13 to 2 μm.

6. The heat exchanger according to claim 5, wherein each amount of the titanium, the zirconium, the niobium and the tantalum in the chemical composition is 0.01 to 1 mass %, 0.05 to 1.5 mass %, 0.02 to 1 mass %, and 0.05 to 1.5 mass %, respectively.

7. The heat exchanger according to claim 6, wherein the heat exchanger exhibits a 0.2% proof stress of 450 MPa or more at room temperature and a creep temperature endurable for 100,000 hours at a stress of 58 MPa being 875° C. or higher.

8. The heat exchanger according to claim 5, wherein the heat exchanger exhibits a 0.2% proof stress of 450 MPa or more at room temperature and a creep temperature endurable for 100,000 hours at a stress of 58 MPa being 875° C. or higher.

* * * * *